(12) United States Patent
Aoyama et al.

(10) Patent No.: US 8,311,801 B2
(45) Date of Patent: Nov. 13, 2012

(54) TECHNOLOGY FOR SUPPORTING MODIFICATION OF MESSAGES DISPLAYED BY PROGRAM

(75) Inventors: Nozomu Aoyama, Kanagawa (JP); Shinkichi Hamada, Kanagawa-ken (JP); Shinsaku Kudomi, Kanagawa (JP); Yuko Ito, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/178,697

(22) Filed: Jul. 24, 2008

(65) Prior Publication Data

US 2009/0055161 A1  Feb. 26, 2009

(30) Foreign Application Priority Data

Aug. 21, 2007 (JP) .................. 2007-214395

(51) Int. Cl.
*G06F 17/28* (2006.01)
(52) U.S. Cl. .................... 704/7; 704/8; 704/10
(58) Field of Classification Search .......... 704/7–8, 704/10
See application file for complete search history.

(56) References Cited

U.S. PATENT DOCUMENTS

| | | | |
|---|---|---|---|
| 6,275,790 B1 * | 8/2001 | Yamamoto et al. | 704/8 |
| 6,526,426 B1 * | 2/2003 | Lakritz | 715/264 |
| 6,567,973 B1 * | 5/2003 | Yamamoto et al. | 717/136 |
| 6,647,364 B1 * | 11/2003 | Yumura et al. | 704/4 |
| 7,020,601 B1 * | 3/2006 | Hummel et al. | 704/2 |
| 7,024,365 B1 * | 4/2006 | Koff et al. | 704/270.1 |
| 7,536,640 B2 * | 5/2009 | Zhang et al. | 715/234 |
| 7,788,648 B2 * | 8/2010 | Bossom et al. | 717/136 |
| 7,913,228 B2 * | 3/2011 | Ericsson et al. | 717/123 |
| 7,930,167 B2 * | 4/2011 | Young et al. | 704/8 |
| 2002/0111788 A1 * | 8/2002 | Kimpara | 704/2 |
| 2003/0110469 A1 * | 6/2003 | Jackson | 717/113 |
| 2003/0135360 A1 * | 7/2003 | Barker et al. | 704/8 |
| 2004/0143631 A1 * | 7/2004 | Banerjee et al. | 709/206 |
| 2005/0197826 A1 * | 9/2005 | Neeman | 704/2 |
| 2007/0245321 A1 * | 10/2007 | Cosgrove et al. | 717/136 |
| 2008/0040094 A1 * | 2/2008 | Wolgemuth et al. | 704/2 |
| 2009/0326917 A1 * | 12/2009 | Hegenberger | 704/7 |

FOREIGN PATENT DOCUMENTS

| | | |
|---|---|---|
| JP | 04-230532 A | 8/1992 |
| JP | 05-189372 A | 7/1993 |
| JP | 2002-123393 A | 4/2002 |
| JP | PUPA2003-505787 | 2/2003 |
| JP | 2005-157720 A | 6/2005 |
| WO | 2006/088295 A1 | 8/2006 |

* cited by examiner

OTHER PUBLICATIONS

Gillam. "Developing Global Applications in Java", Sep. 1999.*

*Primary Examiner* — Greg Borsetti
(74) *Attorney, Agent, or Firm* — Winstead, P.C.

(57) ABSTRACT

A method, system and computer program product for improving the efficiency of changing or modifying a message displayed by a program. A memory unit stores a message read and displayed by the execution of a program, associating it with a language in which the message is written. An execution unit reads from the memory unit and displays the message corresponding to a language set by a user by executing the program. An editing unit edits the message stored in the memory unit and stores the edited message into the memory unit, associating it with a different language from that of the unedited message. A setting unit changes the language of the message displayed by the execution unit, where the execution unit reads from the memory unit and displays the message corresponding to the language changed by the setting unit thereby displaying the edited message instead of the unedited message.

5 Claims, 19 Drawing Sheets

DATE RANGE

Select a preset date range or enter a custom start da...

| Preset | Select a Preset Date ▽ | or |
| --- | --- | --- |
| Start Date | Select a Preset Date | |
| | Last 60 minutes | |
| | Last Complete Clock Hour | |
| | Previous 24 Hour | |
| | Last Day | |
| | Previous 7 Days | |
| | Last Week | |
| | Last Month | |
| | Month to Date | |

ADVANCED

Define your da...

Filters ...ese filters

OBJECT PROGRAM 207 --- 202

102

LANGUAGE PRIORITY

SELECT A LANGUAGE TO BE USED

LANGUAGE

| JAPANESE [ja] |
| ENGLISH [en] |

[ OK ]   [ CANCEL ]

FIG. 4

| MESSAGE ID | MESSAGE |
|---|---|
| common. login. pageheader | [<A HREF="/help/resource Editor. js p?res=msg1_ja&line=19">msg1_ja:_DB G0:19</A>Application Monitor へようこそ] |
| common. login. pagecontent | [<A HREF="/help/resource Editor. js p?res=msg1_ja&line=20">msg1_ja:_DB G0:20</A>セッションを開始するには、ユーザ名とパスワードを入力してください] |
| ... | ... |

| MESSAGE ID | MESSAGE |
|---|---|
| common. login. pageheader | [<A HREF="/help/resource Editor. jsp?res=msg1_ja&line=19">msg1_ja:_DB G1:19</A>Application Monitorへいらっしゃいませ] |
| common. login. pagecontent | [<A HREF="/help/resource Editor. jsp?res=msg1_ja&line=20">msg1_ja:_DB G1:20</A>セッションを開始するには、ユーザ名とパスワードを入力してください] |
| ... | ... |

TECHNOLOGY FOR SUPPORTING MODIFICATION OF MESSAGES DISPLAYED BY PROGRAM

FIELD OF THE INVENTION

The present invention relates to a technology for supporting program modification work. Particularly, the present invention relates to a technology for supporting modification of a message displayed by a program.

BACKGROUND ART

In recent years, web application programs supporting a plurality of languages have been used. If a user accesses a web server which runs this type of program, the program is executed by the web server and displays a message indicating a result of the program execution. In the case where the user changes the setting of a language by operating a web browser, the message is displayed in the language set by the change operation. Each user can set his/her own web browser individually and display a message in a desirable language for the user. For information about a technology supporting the development of the application program which supports a plurality of languages, refer to Japanese Unexamined PCT Publication No. 2003-505787, for example.

In order to develop this type of application program which supports a plurality of languages, a program developer pursues the development work with the aid of a translator of messages. For example, in the case of checking a program operation, the translator checks whether the displayed message is correct by actually running the program. In the case where the translator does not understand the principle of operation of the program, the translator cannot determine which part should be modified in the program even if he/she has found that one message includes a mistranslation. In this case, the translator asks the developer to modify text data displayed as a message by the program. In this manner, the program development often requires the collaborative work carried out by a plurality of experts who differ in their expertise, which sometimes leads to an increase in development cost or development period.

In addition, after correcting the mistranslation, the translator restarts the program whose message has been modified to check whether the modification is correctly reflected in the program. In the case where the program has some degree of size, it takes a certain amount of time to restart the program. Furthermore, after the restart, it sometimes takes a certain amount of processing time until the message is displayed. This kind of time is unnecessary because it is not related to actual development or validation work, which thereby reduces the efficiency of the development or validation in some cases.

SUMMARY OF THE INVENTION

Therefore, it is an object of the present invention to provide a system, method, and program capable of solving the above problem. This object is achieved by a combination of features set forth in the independent claims. Moreover, dependent claims define more advantageous embodiments of the present invention.

In order to solve the above problem, according to a first aspect of the present invention, there is provided a system comprising: a memory unit which stores a message read and displayed by executing a program, associating it with a language in which the message is written; an execution unit which reads from the memory unit and displays the message corresponding to a language preset by a user by executing the program; an editing unit which edits the message stored in the memory unit and stores the edited message into the memory unit, associating it with a different language from that of the unedited message, on the basis of a user's instruction; and a setting unit which makes a setting for changing the language of the message displayed by the execution unit from the language corresponding to the unedited message to the language associated with the edited message, wherein the execution unit reads from the memory unit and displays the message corresponding to the language set by the setting unit, thereby displaying the edited message instead of the unedited message.

Note that the foregoing summary of the invention is not intended to enumerate all features required for the present invention, but a subcombination of these feature groups may also be the invention.

BRIEF DESCRIPTION OF THE DRAWINGS

FIG. 4 is a diagram showing a second example of the display screen of the web browser 102 according to this embodiment.

FIG. 9B is a diagram showing a specific example of a message file 710 read by the object program 207 in S640 of FIG. 6.

FIG. 11B is a diagram showing a specific example of a message file 720 read by the object program 207 in the second S640.

BEST MODE FOR CARRYING OUT THE INVENTION

Hereinafter, the present invention will be described by way of embodiments. The embodiments described below, however, are not intended to limit the present invention according to the claims, and all of combinations of features described in the embodiments are not necessarily indispensable for the solving means of the present invention.

Figure 1:
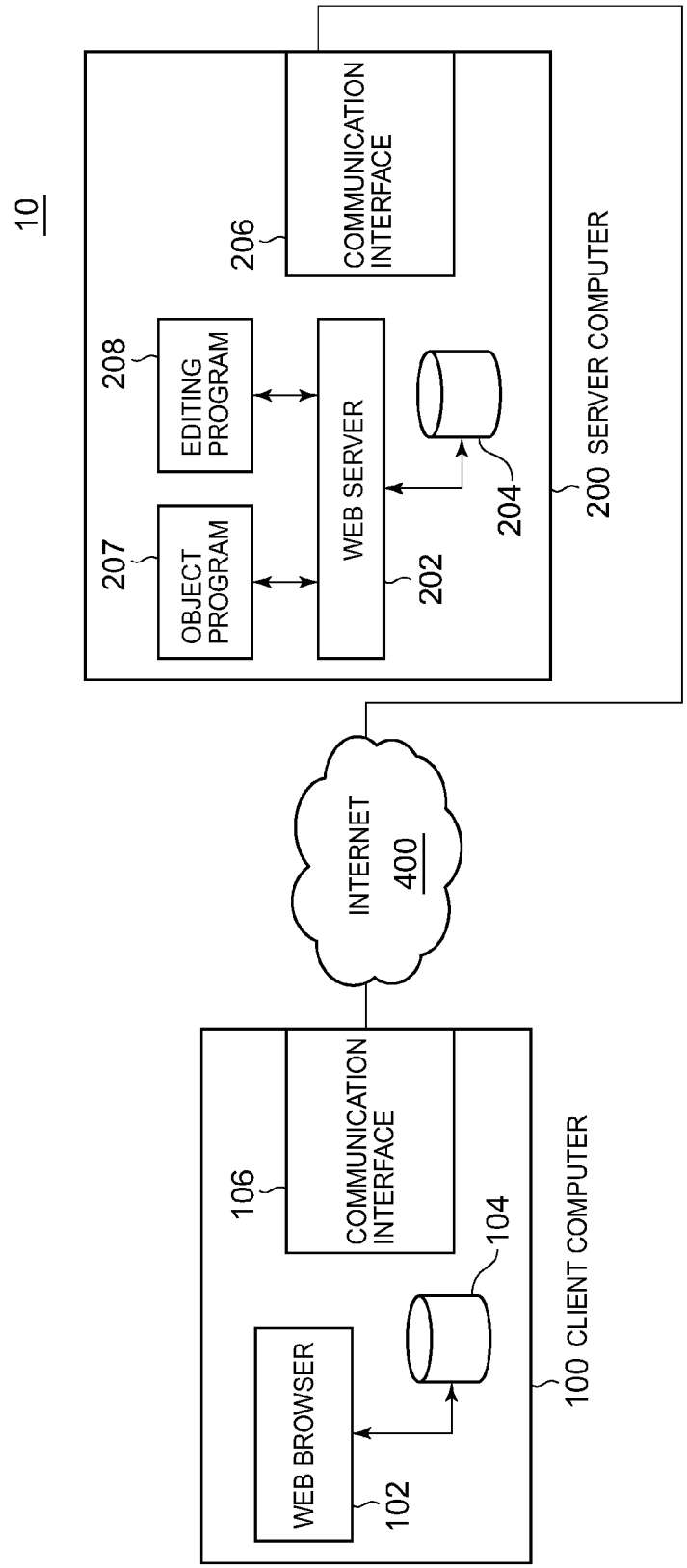
FIG. 1 is a diagram showing an outline of the configuration of an information system 10 according to this embodiment.

Referring to FIG. 1, there is shown an outline of a configuration of an information system 10 according to this embodiment. The information system 10 includes a client computer 100 and a server computer 200. The client computer 100 includes a memory unit 104 and a communication interface 106 as basic hardware components. Additionally, the client computer 100 functions as a web browser 102 by causing an arithmetic unit such as a CPU to execute a program read from the memory unit 104. The server computer 200 includes a memory unit 204 and a communication interface 206 as basic hardware components. Moreover, the server computer 200 functions as a web server 202 by causing the arithmetic unit such as the CPU to execute a program read from the memory unit 204. The web server 202 can run various types of web application programs.

By way of example, the web server 202 runs an object program 207, which is under development and to be changed or modified in this embodiment. The web browser 102 communicates with the server computer 200 via the communication interface 106. For example, the web browser 102 sends a request specifying a uniform resource locator (URL) of the object program 207 to the web server 202. In response thereto, the web server 202 executes the object program 207 and returns screen data indicating a result of the execution to the web browser 102. The web browser 102 displays the execution result on the basis of the received data. Moreover, the web server 202 runs an editing program 208. The editing program 208 supports the modification or change of the web server 202 under development.

In this regard, if the object program 207 is a multi-language supporting web application program, the object program 207 can display a message indicating the execution result or the like of the object program 207 in a language set by a user among the plurality of languages. In order to perform the display, the memory unit 204 stores messages, which are written in various languages and to be read and displayed by the execution of the object program 207, associating them with the languages used in writing the corresponding messages. An example thereof is shown in FIG. 2.

Figure 2:
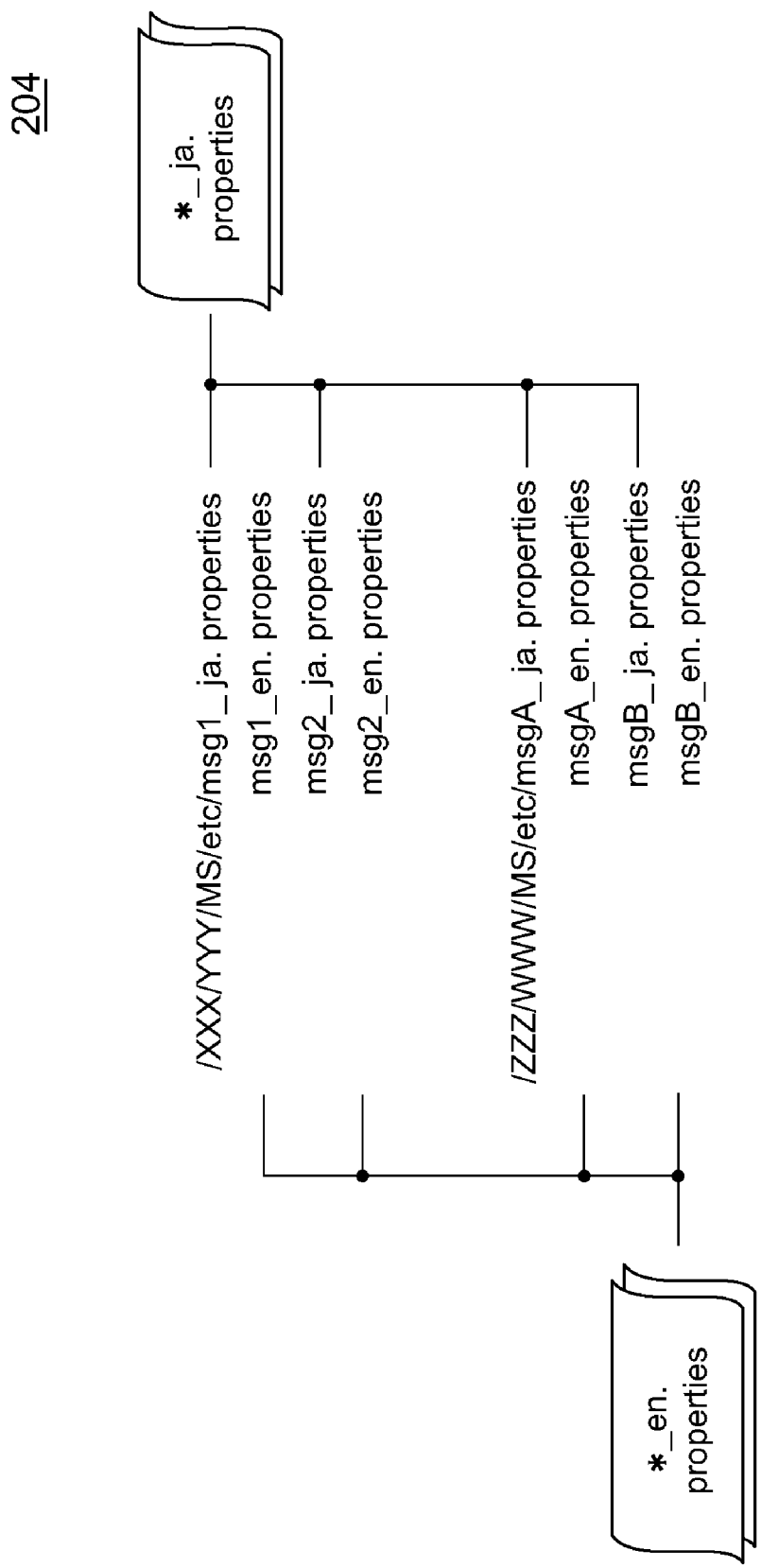
FIG. 2 is a diagram showing an example of a data structure of a memory unit 204 according to this embodiment.

Referring to FIG. 2, there is shown an example of a data structure of the memory unit 204 according to this embodiment. The memory unit 204 stores a file containing messages to be read and displayed by the execution of the application program, for example, for each manufacturer of the application program and each type of application program. More specifically, FIG. 2 shows an example of a file used by a servlet program which runs in a Java™ virtual machine (VM). A symbol "/" is used to indicate a folder structure of the file system and "/XXX/YYYY" indicates a subfolder "YYYY" in a parent folder "XXX." In addition, an extension ".properties" is for use in identifying a file which is read and used by the Java™ program.

As an example, a folder "/XXX/YYYY/MS/etc/" indicates an application program YYYY, which has been developed by XXX Company. The folder contains a file in which messages to be read and displayed by the execution of the program are recorded. A Japanese message among the messages to be displayed by the program execution is recorded in a file having a file name with a suffix "_ja." On the other hand, an English message is recorded in a file having a file name with a suffix "_en."

Similarly, a folder "/ZZZ/WWWW/MS/etc/" indicates an application program WWWW developed by ZZZ Company. In addition, a file with the suffix "_ja" in the folder contains a Japanese message and a file with the suffix "_en" contains an English message.

As described above, even for the same Japanese message recorded in the file, the memory unit 204 may store a plurality of files according to the type of program which uses the message in some cases. Therefore, in the following description, a file containing a Japanese message is generically referred to as "*_ja. properties" using the symbol "*" which indicates an arbitrary text element. Similarly, a file containing an English message is generically referred to as "*_en. properties."

Although FIG. 2 shows English and Japanese messages for ease of explanation, the memory unit 204 can further store messages in other languages and need not necessarily store at least one of the English and Japanese messages. Moreover, a file format of the message stored in the memory unit 204 is not limited to the above ".properties" file. For example, if the object program 207 is a Java™ program, the memory unit 204 can store a message in a file format with an extension of ".class" which allows data to be directly called and executed by the Java™ program.

From the viewpoint of hardware, the memory unit 204 is implemented as a hard disk drive 1040 described later or the like. Meanwhile, from the viewpoint of software, the memory unit 204 is a storage area which can be referenced by a virtual machine (VM) mounted on the web server 202. By way of example, in the case where the VM is a Java™ virtual machine, the storage area stores a path, which is called "Java™ class path," set therein.

Figure 3:
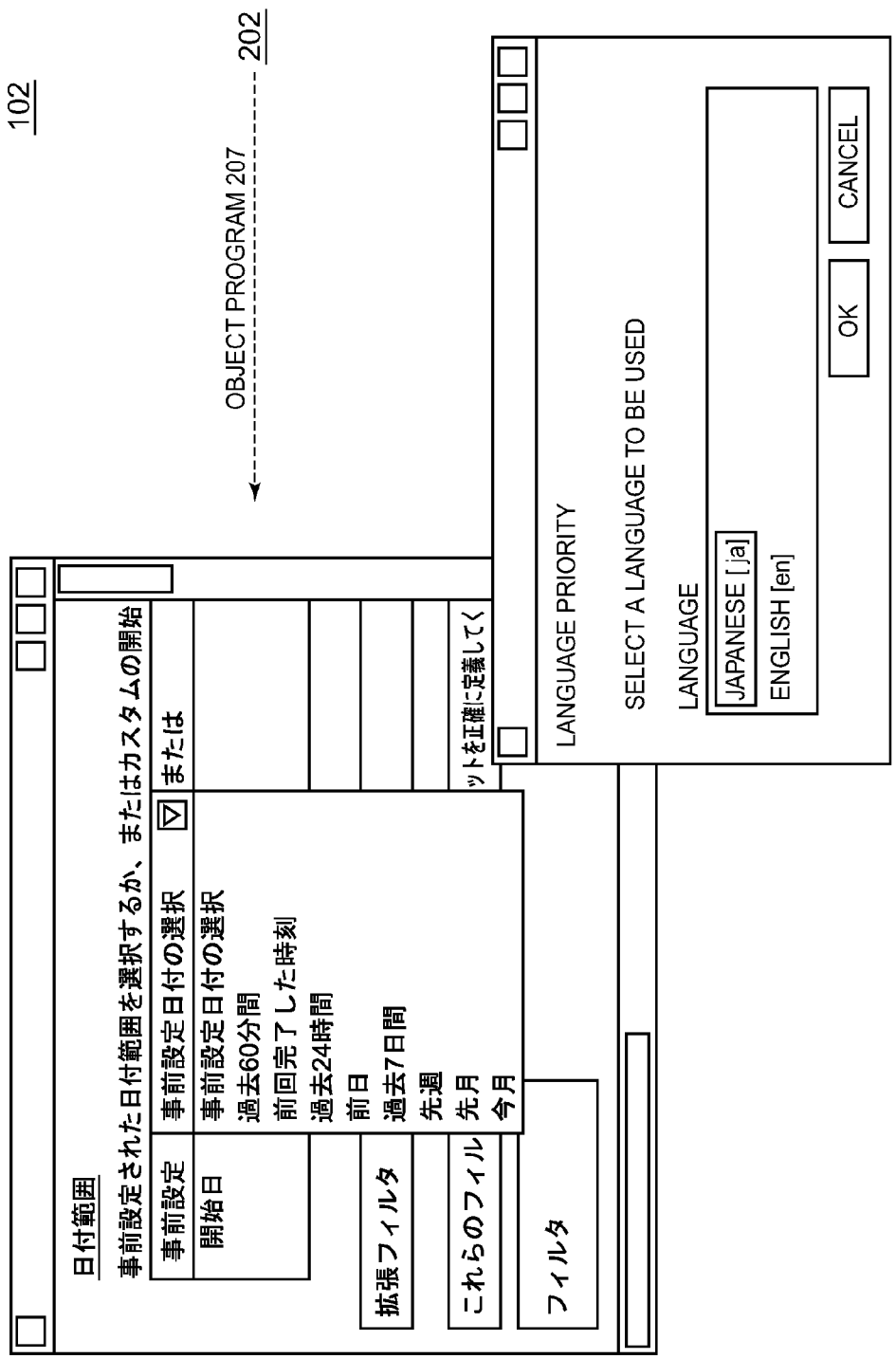
FIG. 3 is a diagram showing a first example of a display screen of a web browser 102 according to this embodiment.

Referring to FIG. 3, there is shown a first example of a display screen of the web browser 102 according to this embodiment. As shown in the lower right of FIG. 3, the language of a message displayed by the execution of the object program 207 is set to Japanese. This setting can be implemented by a user selecting a desired language from an option menu or the like provided as a function of the web browser 102. As shown in the upper left of FIG. 3, the web browser 102 displays a Japanese message based on the execution of the object program 207 on the basis of the above setting. More specifically, the web browser 102 displays a title of a web page, a description of the web page, a title of an input box, menu items, or the like in Japanese according to the execution of the object program 207.

Referring to FIG. 4, there is shown a second example of the display screen of the web browser 102 according to this embodiment. As shown in the lower right of FIG. 4, the language of a message displayed by the execution of the object program 207 is set to English. This setting can be implemented by a user selecting a desired language from an option menu or the like provided as a function of the web browser 102. As shown in the upper left of FIG. 4, the web browser 102 displays an English message based on the execution of the object program 207 on the basis of the above setting. More specifically, the web browser 102 displays a title of a web page, a description of the web page, a title of an input box, menu items, or the like in English according to the execution of the object program 207.

In comparison between FIG. 3 and FIG. 4, the web browser 102 displays a message having the same content in either of English and Japanese on the basis of the setting. In order to perform the display, a translator or developer previously translates the message into various languages and then stores each translation of the message in an appropriate file in the memory unit 204. Therefore, if the translator translates the message incorrectly, the message displayed by the web browser 102 also includes a mistranslation. For example, in the example in FIG. 3, the menu items include a Japanese message such as "前回完了した時刻 (Last completion time)." It is a mistranslation of an English message "Last Complete Clock Hour." Correctly, a translation "直前の正時刻までの一時間" is appropriate.

The information system 10 according to this embodiment is intended to achieve a more efficient correction of a message including this kind of mistranslation by supporting the editing program 208 which runs on the web server 202. This operation will be described specifically below.

Figure 5:
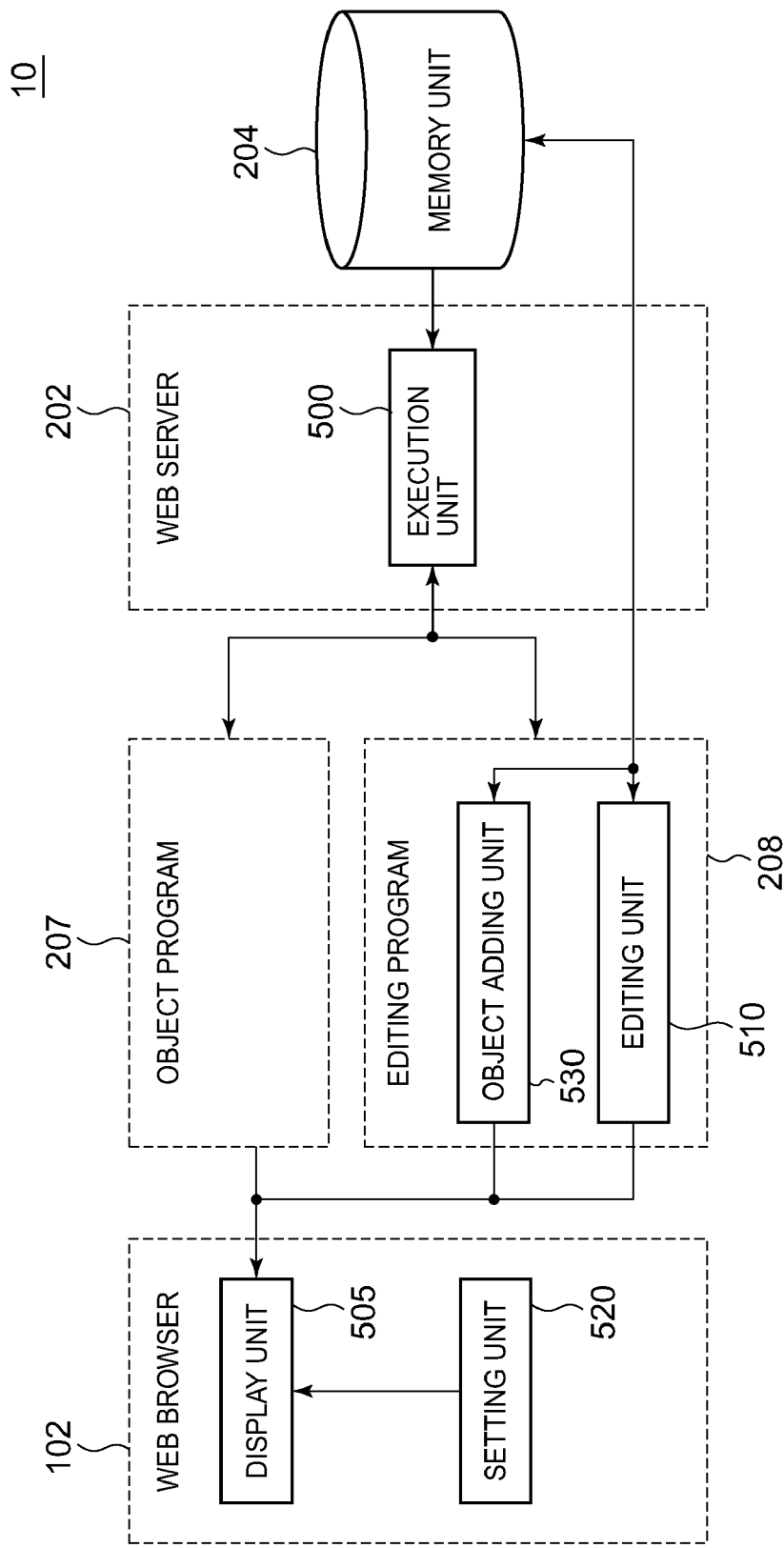
FIG. 5 is a diagram showing a functional configuration of the information system 10 according to this embodiment.

Referring to FIG. 5, there is shown a functional configuration of the information system 10 according to this embodiment. The information system 10 includes an execution unit 500, a display unit 505, an editing unit 510, a setting unit 520, and an object adding unit 530 in the functional configuration. The execution unit 500 executes the object program 207 to read a message corresponding to the language preset by the user from the memory unit 204 and displays it on a display unit 505 of the web browser 102. In addition, the execution unit 500 executes the editing program 208 to cause the server computer 200 to function as the editing unit 510 and as the object adding unit 530.

The object adding unit 530 adds a predetermined display object to each of the plurality of messages stored in the memory unit 204 according to an instruction for the start of editing from the user. The display object added to one message is an object which displays a screen for editing the message when it is operated by the user. The object adding unit 530 then associates the plurality of messages, to which the display objects are added, with a different language from that of the plurality of messages, to which the display objects are not added yet, and stores them into the memory unit 204.

Upon the change of the language setting based on the user's operation, the display unit 505 displays the messages with the display objects added instead of the messages not having the display objects. Then, if one display object is operated by the user, the editing unit 510 displays an editing screen for the message corresponding to the display object on the display unit 505. Then, the editing unit 510 edits the message stored in the memory unit 204 on the basis of a user's instruction. According to an indication of completion of the editing, the editing unit 510 associates the edited message with a different language from that of the unedited message and stores it into the memory unit 204.

The setting unit 520 makes a setting for changing the language of the message displayed by the execution unit 500 from the language corresponding to the unedited message to the language associated with the edited message. This setting is achieved by changing, for example, a language setting in the web browser 102 (referred to as "locale setting" or the like). Alternatively, the setting can be achieved by changing an environment variable in the web server 202. In either case, the execution unit 500 reads from the memory unit 204 and displays the message corresponding to the language set by the setting unit 520. Thereby, the edited message is displayed in the web browser 102 instead of the unedited message.

A relation between the above functions and software components will be briefly described below. The execution unit 500 is implemented as the above web server 202. The web server 202 includes not only an HTTP server which sends or receives an HTTP protocol, but also middleware which runs a program in response to an HTTP request. For example, the web server 202 can include a Java™ virtual machine (VM) and a Java™ server pages (JSP™).

The execution unit 500 can be implemented as the set of servers and can run the object program 207 or the editing program 208 written in various languages such as Java™ or JSP™. Where the server computer 200 receives an HTTP request and the CPU or the like of the server computer 200 executes a program written in Java™, JSP™, or the like, it is hereinafter referred to as "the execution unit 500 executes the program."

Alternatively, where the object program 207 and the editing program 208 are not programs running on the server side such as a Java™ servlet, but programs running on the client side such as JavaScript™, the execution unit 500 can be implemented as the web browser 102. In this case, where the CPU of the client computer 100 executes these programs along with the web browser 102, it is referred to as "the execution unit 500 executes these programs."

The display unit 505 and the setting unit 520 can be implemented as functions of the web browser 102 as described above. In the case where the object program 207 is not a web-based application program as described in this embodiment, but a standalone-program, the display unit 505 and the setting unit 520 are implemented as a function of an operating system on the computer that executes the program. On the other hand, the editing unit 510 and the object adding unit 530 are implemented as the editing program 208 written, for example, in Java™ or JSP™. Alternatively, the editing unit 510 and the object adding unit 530 can be implemented as a program component, such as the web browser 102, running on the client computer 100.

Figure 6:
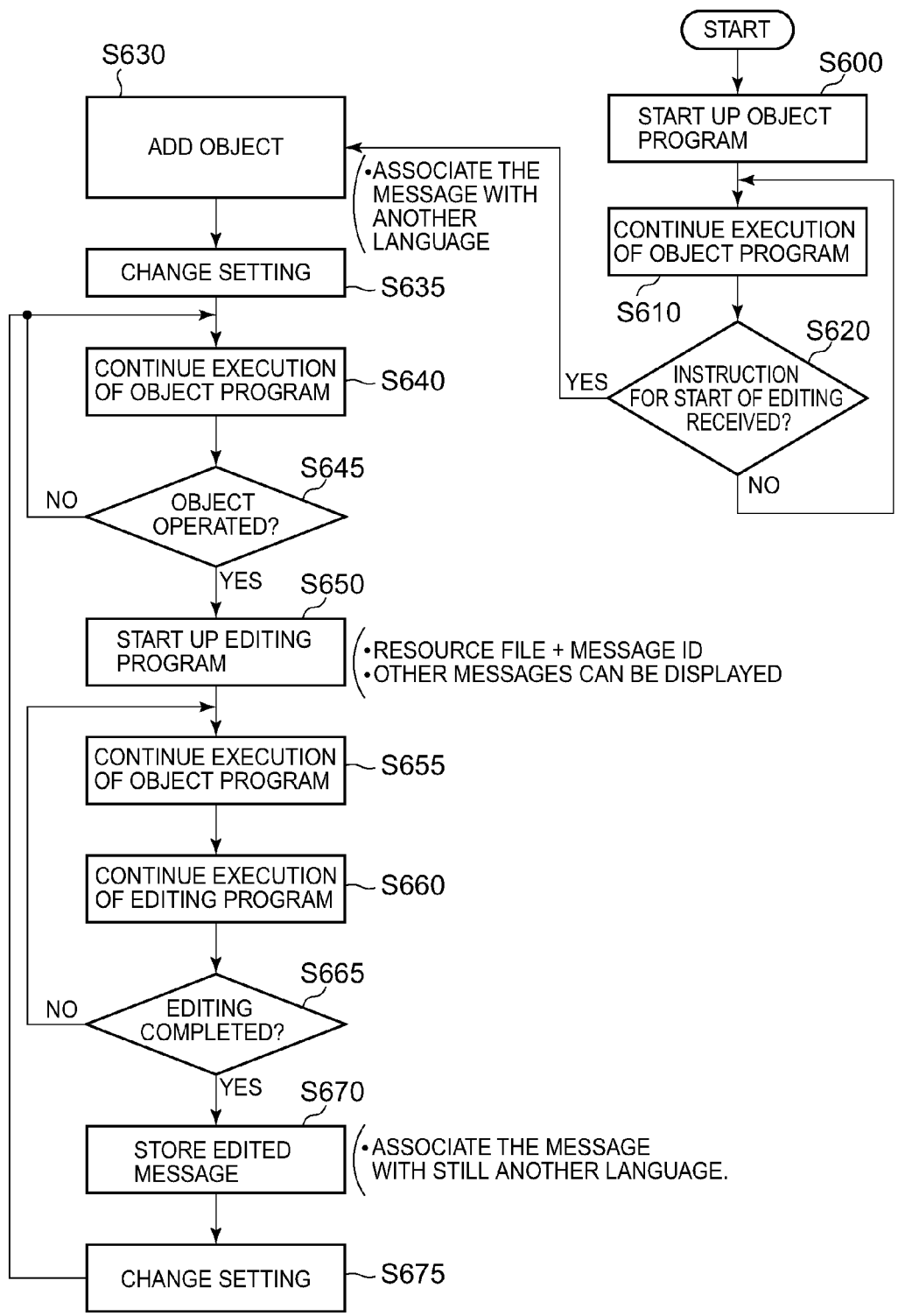
FIG. 6 is a diagram showing a processing flow in which the information system 10 according to this embodiment edits a message in response to a user's operation.

FIG. 6 shows a processing flow in which the information system 10 according to this embodiment edits a message in response to a user's operation. First, the execution unit 500 starts up the object program 207 in response to a request from the client computer 100 (S600). The execution unit 500 continues the execution of the object program 207 (S610) until the client computer 100 receives an instruction for the start of editing from the user (S620: NO). The process of the execution is shown in FIGS. 7A to 7C.

Figure 7A:
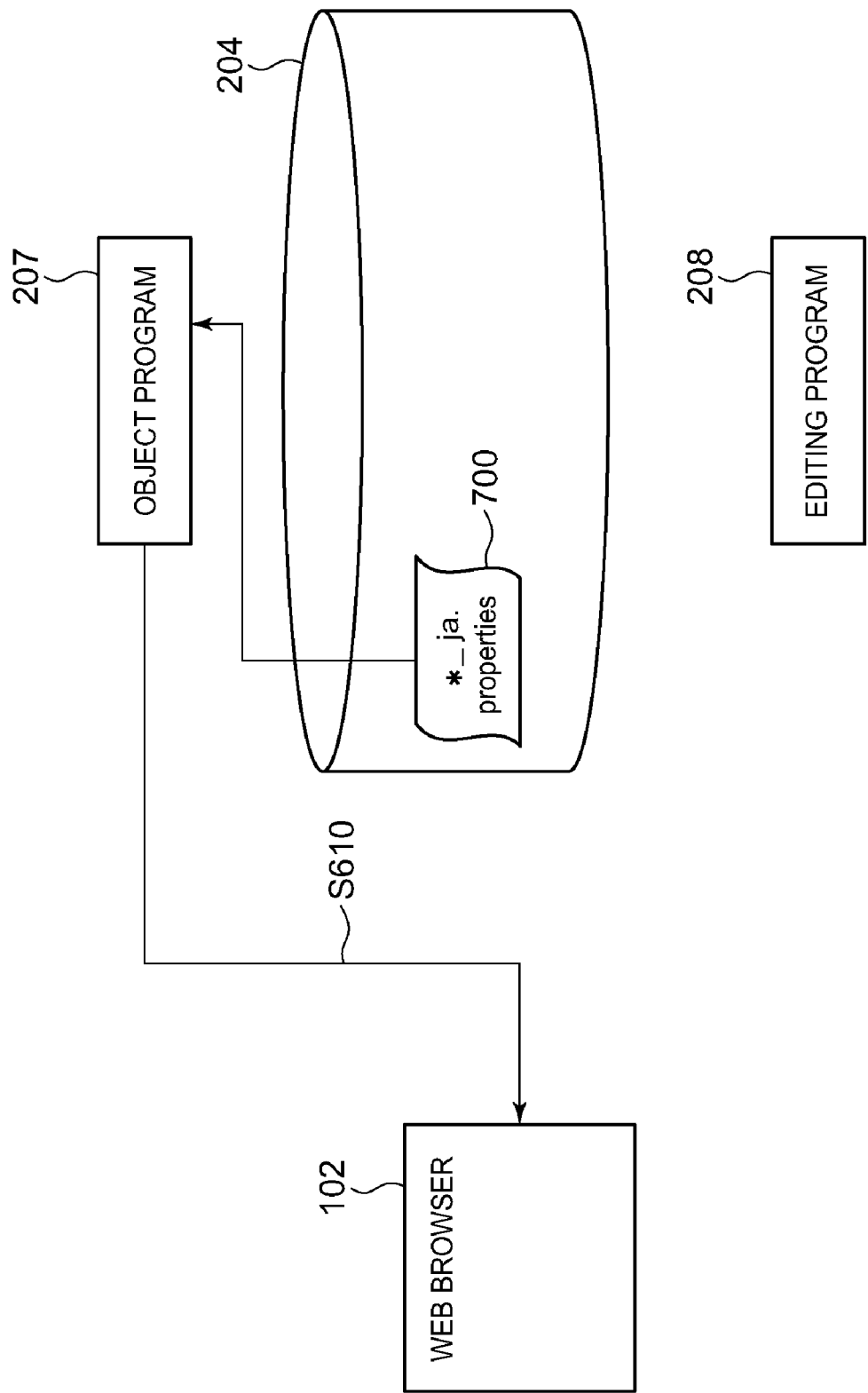
FIG. 7A is a diagram showing an example of operations in S610 of FIG. 6 performed by an object program 207, an editing program 208, and the web browser 102.
Figure 7B:
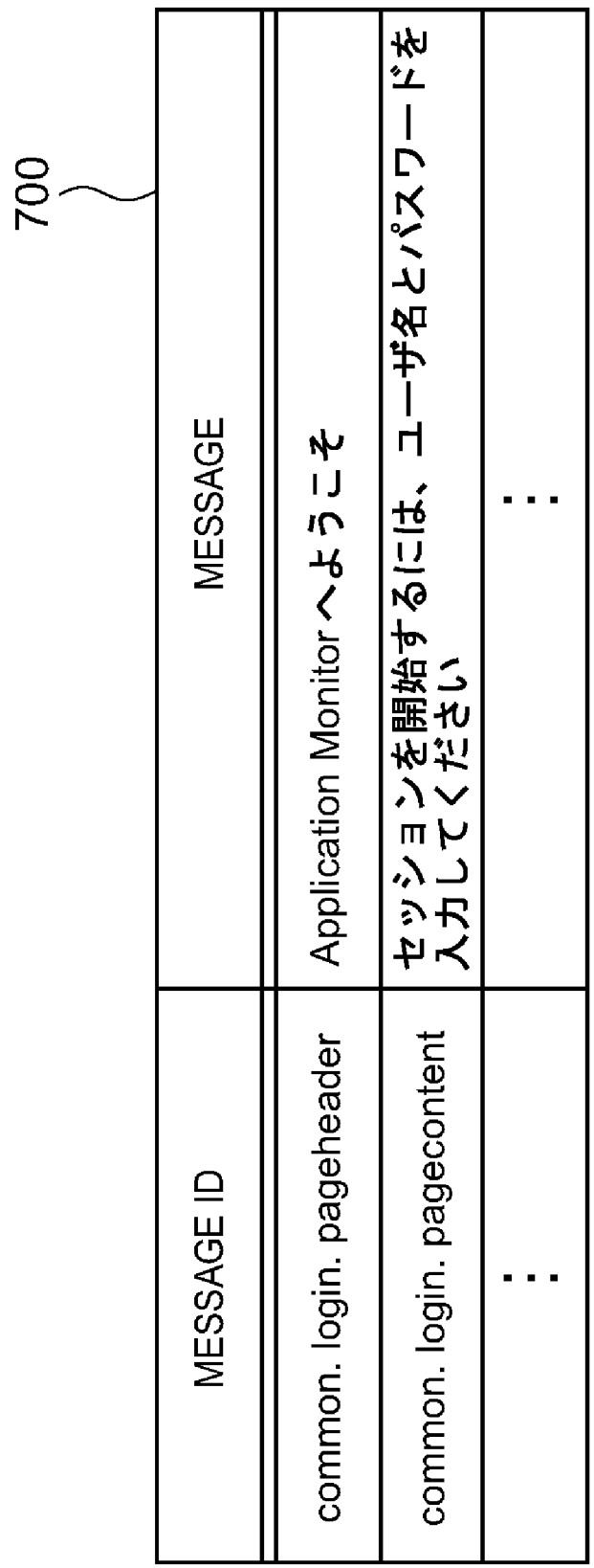
FIG. 7B is a diagram showing a specific example of a message file 700 read by the object program 207 in S610 of FIG. 6.
Figure 7C:
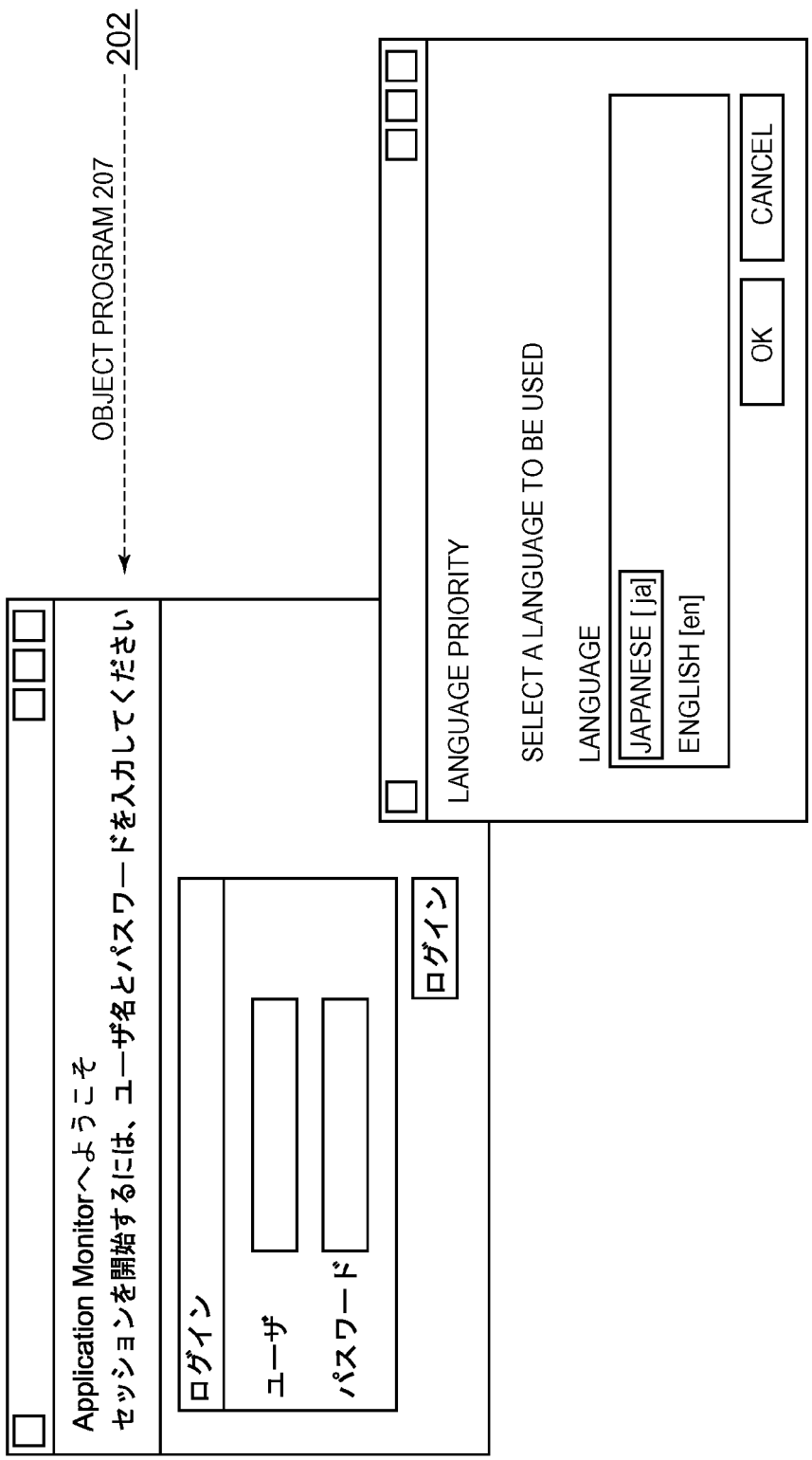
FIG. 7C is a diagram showing a specific example of a screen displayed by the web browser 102 in S610 of FIG. 6.

FIG. 7A shows an example of an operation in S610 of FIG. 6 performed by the object program 207, the editing program 208, and the web browser 102. The memory unit 204 stores a message file 700 containing messages corresponding to Japanese. The execution unit 500 then sequentially displays the messages contained in the message file 700 according to the execution of the object program 207 (S610).

A concrete implementation method of the processing in which the message is read and displayed is, for example, as described below. First, the execution unit 500 retrieves a file containing a suffix "_ja" indicating Japanese from the message files already stored in the memory unit 204. The retrieved file is, for example, the message file 700. The execution unit 500 then previously reads the messages from the retrieved file and caches them. The messages can be cached, for example, in a memory space in the server computer 200 which runs the execution unit 500.

Thereafter, if an API for displaying a message is called with a certain message ID as an argument in the object program 207 executed by the execution unit 500, the execution unit 500 retrieves a message corresponding to the message ID from the cached messages. The execution unit 500 then outputs the retrieved message on the display unit 505.

FIG. 7B shows a specific example of the message file 700 read by the object program 207 in S610 of FIG. 6. The message file 700 records each of the plurality of messages, associating it with identification information (referred to as message ID) for identifying the message. For example, a message "Application Monitor へようこそ (Welcome to Application Monitor)" is recorded in association with a message ID "common.login.pageheader." The object program 207 contains an API call command with the message ID as an argument. The execution unit 500 executes the command to display the message corresponding to the message ID.

FIG. 7C shows a specific example of a screen displayed by the web browser 102 in S610 of FIG. 6. As shown in the lower right of FIG. 7C, the language displayed by the execution of the object program 207 is set to Japanese on the menu screen of the web browser 102 or the like. Then, as shown in the upper left of FIG. 7C, the messages in the message file 700 are read out by the execution of the object program 207 and messages including, for example, "Application Monitor □□□□ (Welcome to Application Monitor)" are displayed on the screen.

Returning to FIG. 6, if an instruction to start editing is received while the execution of the object program 207 is continued (S620: YES), the object adding unit 530 adds an object, which displays the screen for editing the message when it is operated by the user, to each of the plurality of messages stored in the memory unit 204 in response to the instruction (S630). The message, to which the object is added, is stored into the memory unit 204 in association with a different language from that of the message to which the object is not added. Thereafter, the setting unit 520 sets the language of the message displayed on the display unit 505 by the execution unit 500 to the language associated with the message, to which the object is added by the object adding unit 530, on the basis of the user's instruction (S635).

As a result, the execution unit 500 reads from the memory unit 204 and displays the messages corresponding to the language set by the setting unit 520 by continuing the execution of the object program 207 (S640). Thereby, the execution unit 500 can display the messages to which the objects are added, instead of the messages to which the objects are not added. FIG. 8 and FIGS. 9A to 9C show examples of these screens.

Figure 8:
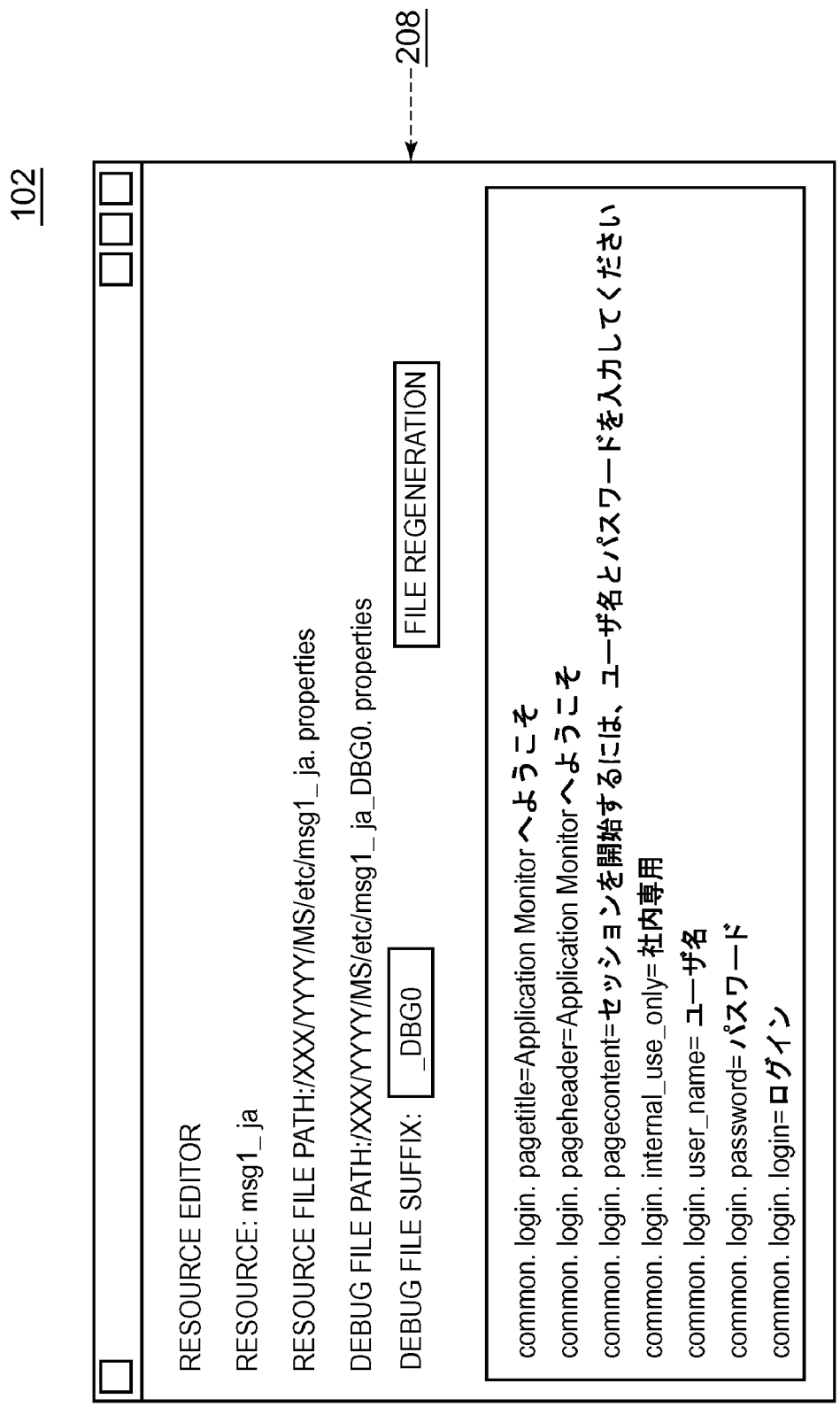
FIG. 8 is a diagram showing an example of a screen for use in accepting an instruction for the start of editing from a user in S620 of FIG. 6.

FIG. 8 shows an example of a screen for accepting the instruction from the user to start editing in S620 of FIG. 6. If the user gives the instruction to start editing of a message file msg1_ja (which is used by an application program YYYY of XXX Company), for example, the editing program 208 thereupon starts the operation to display the screen shown in FIG. 8 in the web browser 102. If the user enters, for example, "_DBG0" into a field "デバッグ用ファイルサフィックス (Debug file suffix)" and pushes the button "ファイル再生成 (File regeneration)," then a new file with "_DBG0" added to the file name is regenerated.

The file name of the regenerated file is, for example, "/XXX/YYYY/MS/etc/msg1_ja DBG0.properties." An object which displays a screen for editing the message when operated is added to each of the messages recorded in the new file. In addition, the web browser 102 can display the contents of the resource file in the lower part of the screen.

Figure 9A:
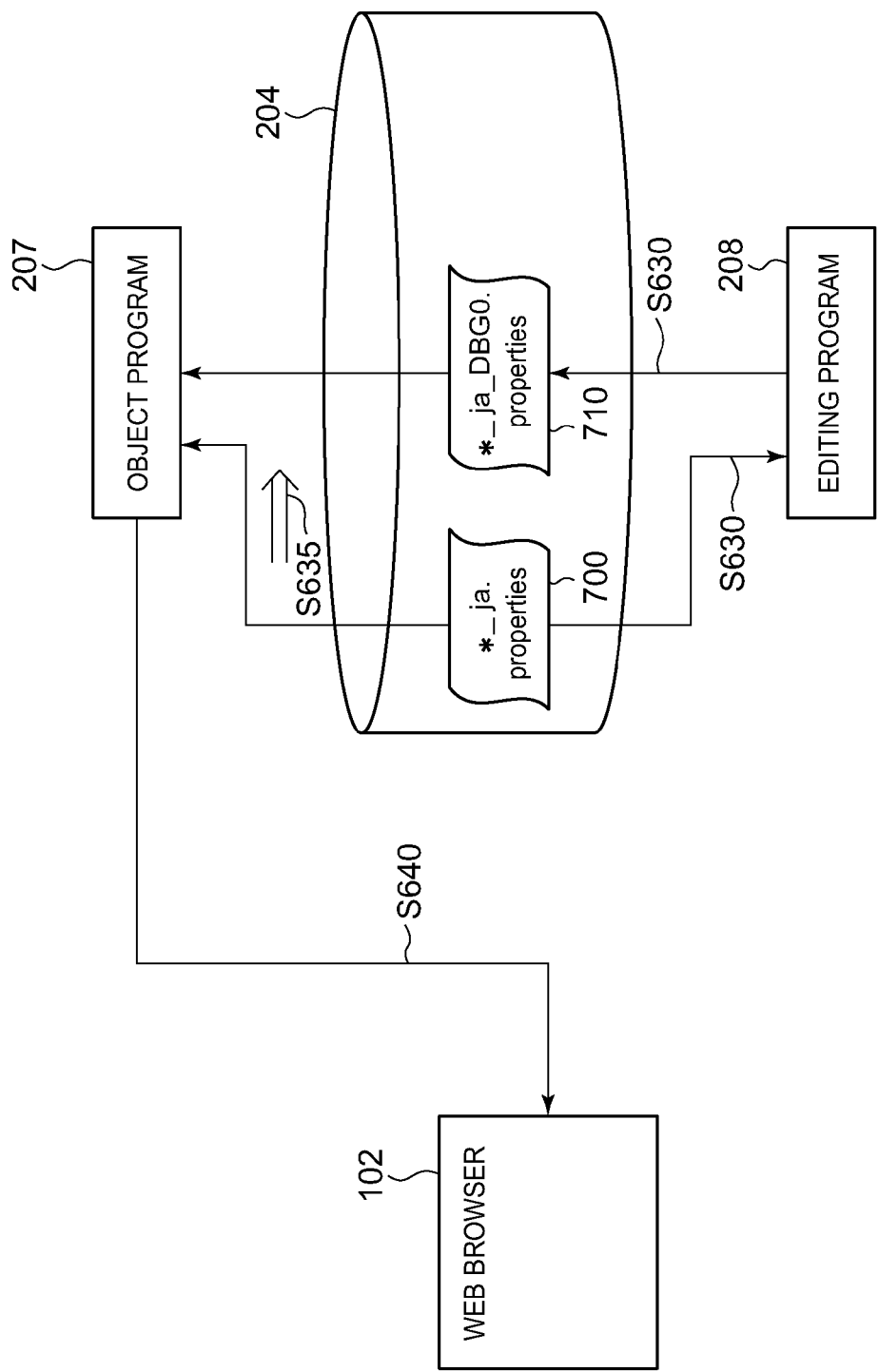
FIG. 9A is a diagram showing an example of an operation in S630 to S640 of FIG. 6 performed by the object program 207, the editing program 208, and the web browser 102.

FIG. 9A shows an example of the operations from S630 to S640 of FIG. 6 performed by the object program 207, the editing program 208, and the web browser 102. FIG. 9B shows a specific example of a message file 710 read by the object program 207 in S640 of FIG. 6. The operations of the object adding unit 530 and the setting unit 520 will now be described in this order with reference to these diagrams. The object adding unit 530 retrieves a file to which an object is not added (for example, a part of the message file 700) from the memory unit 204 and reads it out, first. The file is read from, for example, a path given as a resource file path by the user as shown in FIG. 8.

Then, the object adding unit 530 adds a display object to each of the messages recorded in the read file so as to generate the message file 710 containing the messages with the display objects added. By way of example, the display object is an HTML hyperlink in the case where each message is written in HyperText Markup Language (HTML). In its generation method, first, the object adding unit 530 scans the read file to determine the line number of a line in which each message is recorded in the file.

Then, the object adding unit 530 generates a display object on the basis of the name of the file, the determined line number, and a predetermined URL which indicates the editing program 208. Specifically, the object adding unit 530 generates a hyperlink with the file name and the line number given as parameters in the URL and adds it to each message. For example, a character string "/help/resourceEditor.jsp" is a URL of the editing program 208 which runs on the web server 202.

Moreover, a character string "res=msg1_ja" indicates that a character string "msg1_ja" is assigned to a parameter "res" which indicates the name of a file to be edited. In addition, "line=19" indicates that 19 is the line number where the message to be edited is recorded in the file. Since the character string "Application Monitor □□□□ (Welcome to Application Monitor)" is recorded in line 19 of the file, the parameter to be added is "line=19." Another line number is added to a message recorded in another line. Alternatively, the parameter to be added can be a message ID.

Then, in S630, the object adding unit 530 stores a message with an object added into the memory unit 204 as the message file 710. In order to cause the execution unit 500 to recognize as if the message recorded in the message file 710 were written in a different language from the language of the message recorded in the message file 700 to which the object is not added, a different suffix from that of the file name of the message file 700 is added to the file name of the message file 710. By way of example, the object adding unit 530 applies the file name "msg1_ja_DBG0," which has been given by the user as a debug file path as shown in FIG. 8, to the message file 710.

Furthermore, the object adding unit 530 can add the file name and line number to be edited to the message as display character strings so that the user can recognize the role of the hyperlink more easily. In order to improve the user's convenience, a character string "msg1_ja: DBG0:19" or the like indicating the added parameters can be added to the message.

Then, in S635, the setting unit 520 sets the language of the message displayed by the execution unit 500 to the language associated with the message to which the hyperlink is added, on the basis of a user's instruction. Consequently, the execution unit 500 reads and displays the message from the message file 710, instead of the message file 700, by continuing the execution of the object program 207 (S640).

Figure 9C:
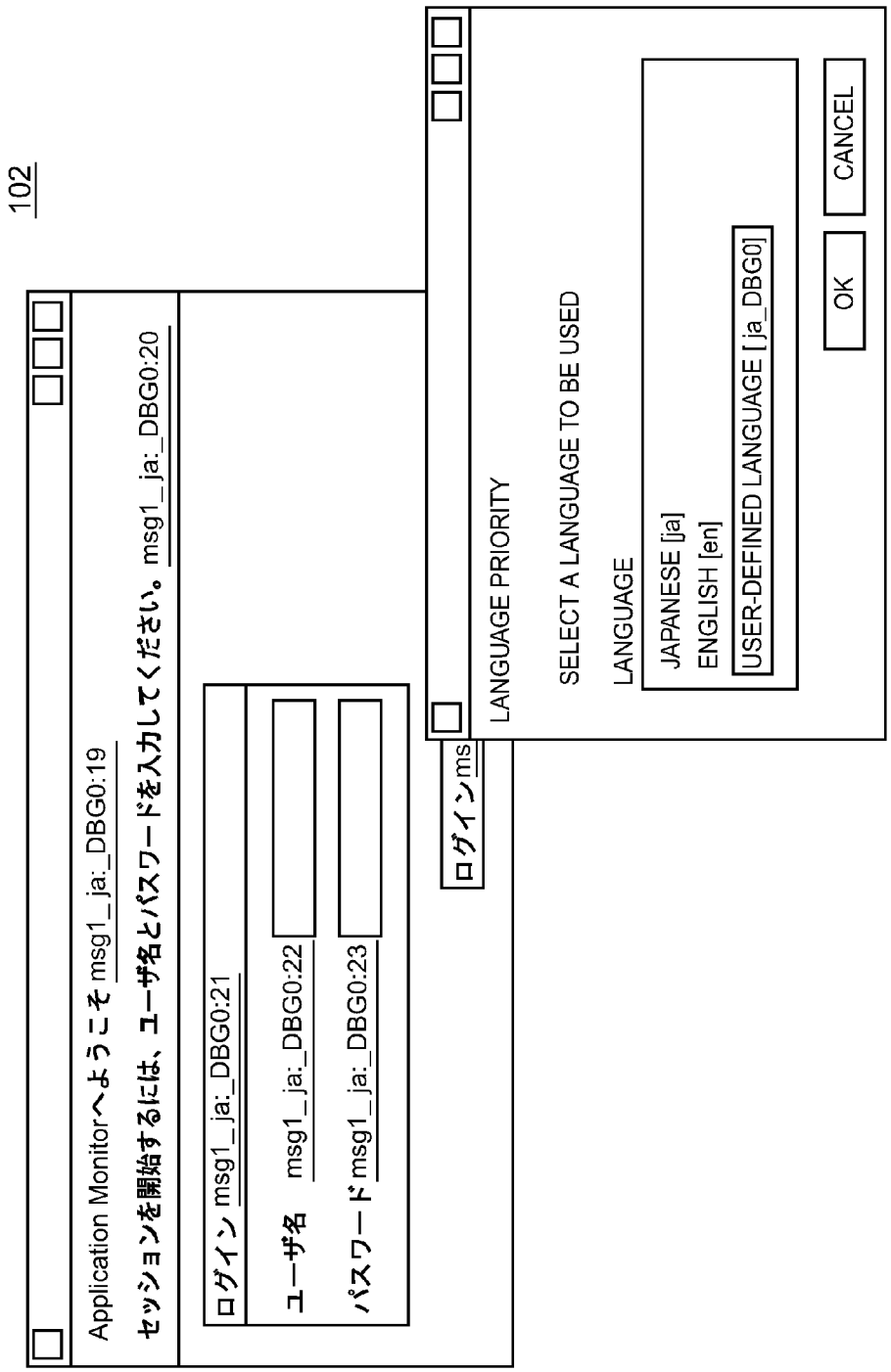
FIG. 9C is a diagram showing a specific example of a screen displayed by the web browser 102 in S640 of FIG. 6

Referring to FIG. 9C, there is shown a specific example of a screen displayed by the web browser 102 in S640 of FIG. 6.

As shown in the lower right of FIG. 9C, the setting unit 520 sets the language of the message displayed by the execution unit 500 to the language (ja_DBG0) associated with the message to which the hyperlink is added on the basis of a user's instruction. The execution unit 500 thereby attempts to display a message corresponding to the language set by the setting unit 520 by continuing the execution of the object program 207. The execution unit 500 retrieves the message to be displayed from the messages previously cached in the memory space within the server computer 200.

The message associated with the new language is not stored in the memory unit 204 on startup of the object program 207, and therefore the execution unit 500 cannot cache it into the memory space. In the case where the setting unit 520 sets a new language during execution of the object program 207, the execution unit 500 retrieves and reads a message corresponding to the new language from the memory unit 204 even if the object program 207 is being executed. Consequently, as shown in the upper left of FIG. 9C, a message to which the hyperlink is added is displayed, instead of the message to which the hyperlink is not added, in the web browser 102. For example, a hyperlink such as "msg1_ja:_DBG0:19" is added to a message "Application Monitor へようこそ (Welcome to Application Monitor)" or the like.

Returning to FIG. 6, the display unit 505 then determines whether the display object added to some message has been operated by the user (S645). If it is operated as described above (S645:YES), the editing unit 510 starts the operation to display the screen for editing the message (S650). Specifically, the editing program 208 for implementing the editing unit 510 is executed by the execution unit 500 and various parameters contained in the display object are given as input parameters to the editing program 208. Thereby, the editing unit 510 can display an edit screen for editing the message to which the display object is added.

Also during the display of the edit screen, the execution unit 500 can continue the execution of the object program 207 (S655). In addition, the execution unit 500 continues the execution of the editing program 208, by which the editing unit 510 accepts the editing operation of the message (S660). Upon receiving an indication of the completion of editing (S665: YES), the editing unit 510 stores the edited message into the memory unit 204, associating it with a different language from that of the unedited message (S670). The setting unit 520 makes a setting for changing the language of the message displayed by the execution unit 500 to the language associated with the edited message (S675). If the execution unit 500 thereby continues the execution of the object program 207, the edited message is displayed instead of the unedited message (second S640). The details of the above processing will be shown in FIG. 10 and FIGS. 11A to 11C.

Figure 10:
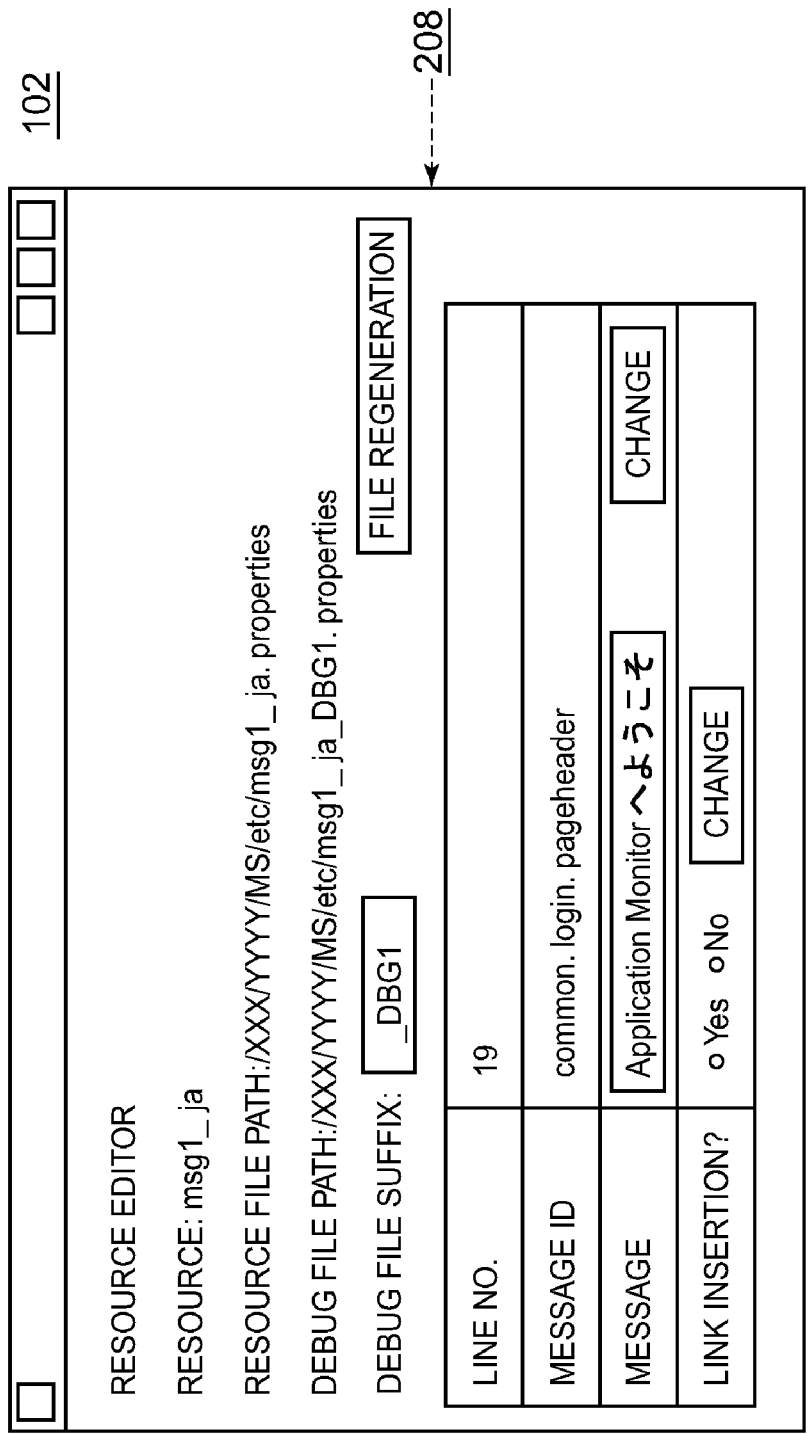
FIG. 10 is a diagram showing an example of a screen for the editing program 208 started up in the case where the object is operated in S645.

FIG. 10 shows an example of the screen of the editing program 208, which is started in the case where the object is operated in S645. The editing unit 510 is implemented by the execution of the editing program 208 performed by the execution unit 500 and displays a screen shown in FIG. 10 in the web browser 102 upon the start of the operation. Specifically, the editing unit 510 displays a line number of a line in which the message to be edited is recorded in the file, a message ID of the message, and the message itself. Since the purpose is to edit the message, the editing unit 510 displays the message in such a way that the message can be changed. More specifically, the editing unit 510 displays the message within a text input box and a button for use in saving the changed content after the content is changed. Additionally, in order to improve the convenience of the change work, the editing unit 510 can retrieve and display a message in another language (for example, English) corresponding to the message concerned from the memory unit 204.

The outline of the internal processing of the editing unit 510 is as described below. The editing unit 510 determines the file in which the message to be edited is recorded on the basis of the parameters specified with being included in the hyperlink. The editing unit 510 then reads the file from the memory unit 204. In the example in FIG. 10, "/XXX/YYYY/MS/etc/msg1_ja.properties" is the path name of the file concerned. For example, the editing unit 510 generates the path name by concatenating a predetermined folder name "/XXX/YYYY/MS/etc/" and an extension name ".properties" with the file name part "msg1_ja" included in the hyperlink, thereby generating the path name. The editing unit 510 reads the file specified by the path name from memory unit 204. The editing unit 510 then retrieves a character string of the line number given in the hyperlink from the file specified by the path name. The retrieved character string then appears in the input box.

The editing unit 510 edits the message on the basis of a user's operation on the input box. For example, the editing unit 510 changes the text displayed as the message in response to a user's keyboard operation or mouse operation. Then, if the button for saving the changed content is operated, the editing unit 510 stores the edited message into the memory unit 204, associating it with still another language. Alternatively, the still another language can be determined based on the user's input similarly to the example in FIG. 8.

For example, the editing unit 510 can accept an input of a suffix for generating a new language like the example in FIG. 10. For example, if the user enters "_DBG1" into the "debug file suffix" box and then presses the "file regeneration" button, a new file with "DBG1" added to the file name is generated. The editing unit 510 records the edited message in the new file. Thereby, it is possible to cause the execution unit 500 to recognize the edited message as if it were written in a different language from that of the unedited message. Additionally, the editing unit 510 can accept from the user, whether the hyperlink should be added to the edited message again or it should be deleted from the edited message.

Figure 11A:
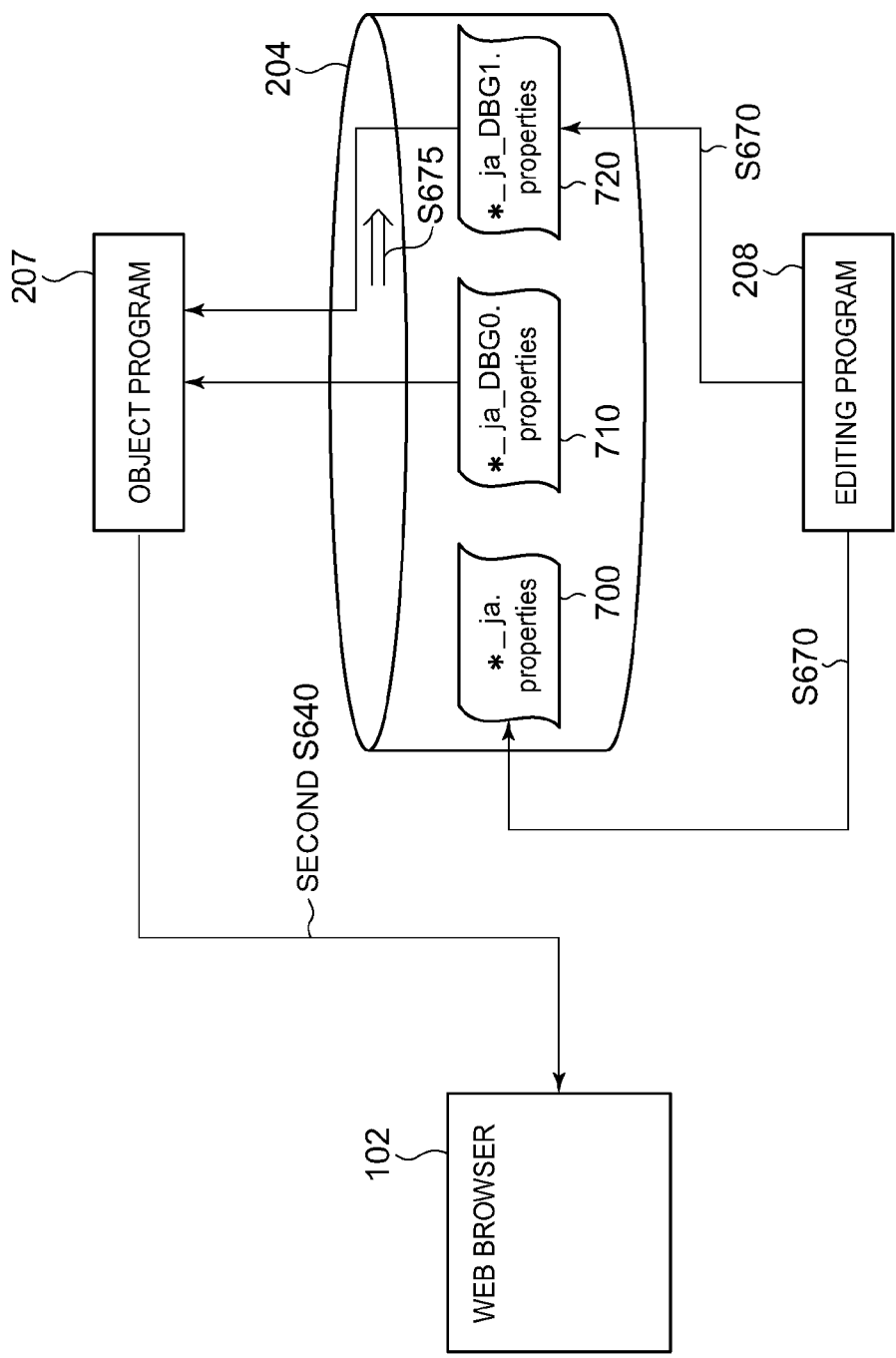
FIG. 11A is a diagram showing an example of operations in S670 to second S640 of FIG. 6 performed by the object program 207, the editing program 208, and the web browser 102.

FIG. 11A shows an example of operations in S670 to the second S640 in FIG. 6 performed by the object program 207, the editing program 208, and the web browser 102. The operations of the editing unit 510 and the setting unit 520 will be described in this order with reference to these drawings. First, the editing unit 510 retrieves and reads the unedited file (for example, a part of the message file 700) from the memory unit 204. The file is read from the path given as a resource file path by the user, for example, as shown in FIG. 10.

Then, the editing unit 510 selects and displays a message specified as a target of editing out of the messages recorded in the read file. The editing unit 510 edits the displayed message on the basis of a user's instruction. The processing of this part is as described with reference to FIG. 10. Thereafter, upon receiving an instruction for saving the edited content, the editing unit 510 stores the edited message into the memory unit 204, associating it with another different language from that of the unedited message. For example, the edited message is recorded in a message file 720 having a suffix "_DBG1." The above hyperlink is directly added to the message recorded in the message file 720 on the basis of a user's specification.

In addition, the editing unit 510 can record the edited message into the message file 700. Thereby, the message file 700 can be used directly as a result of editing without deleting the hyperlink after the completion of editing.

FIG. 11B shows a specific example of the message file 720 read by the object program 207 in the second S640. As a result of editing, the message "Application Monitor へようこそ (Welcome to Application Monitor)" is changed to a message "Application Monitor へいらっしゃいませ (Hello, this is Application Monitor)". Moreover, a hyperlink is added to each message. Note that, however, the suffix "_DBG1" is added to the hyperlink so that the user can recognize the file update generation more easily.

Figure 11C:
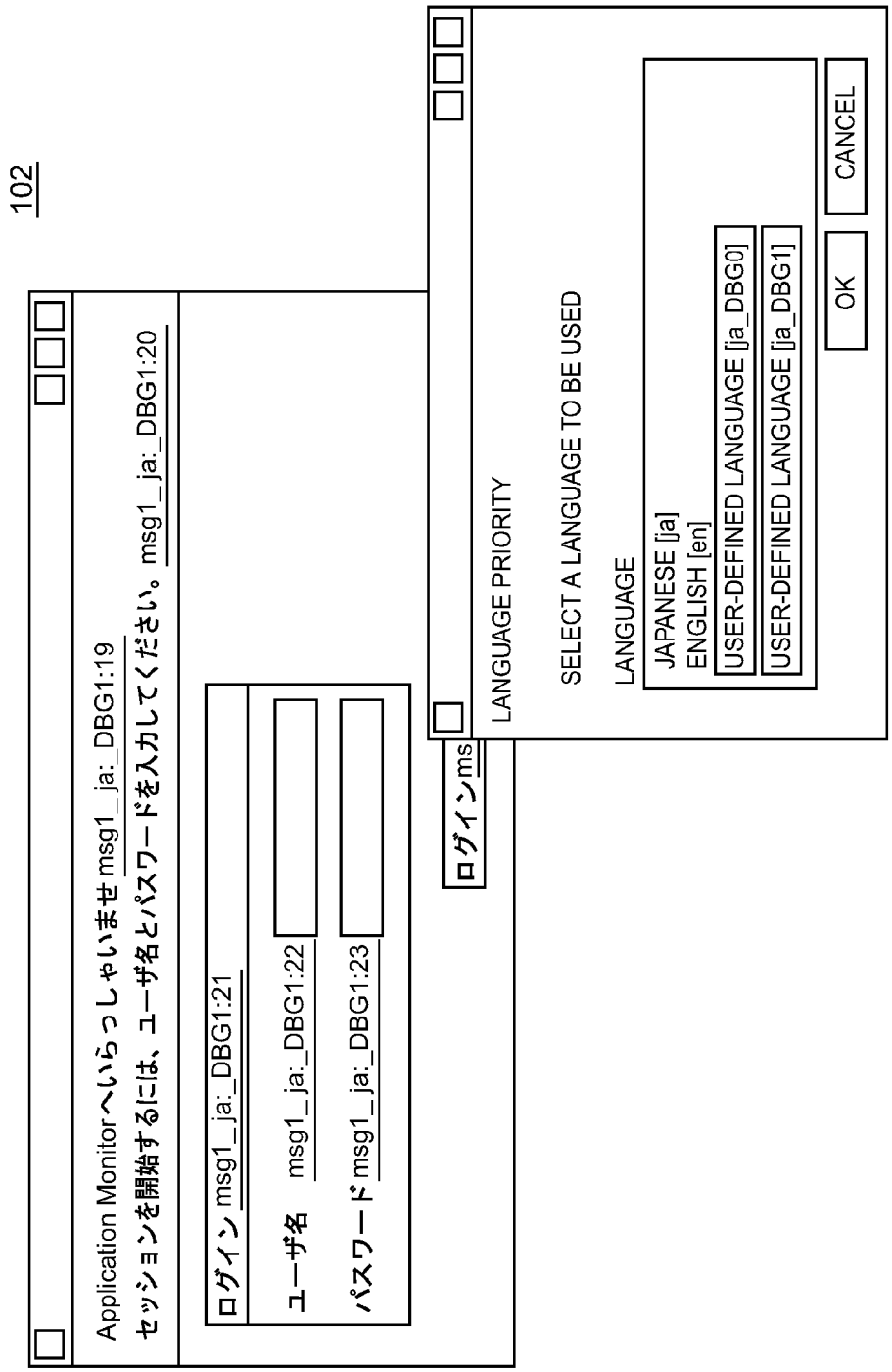
FIG. 11C is a diagram showing a specific example of a screen displayed by the web browser 102 in the second S640.

FIG. 11C shows a specific example of a screen displayed by the web browser 102 in the second S640. As shown in the lower right of FIG. 11C, the setting unit 520 sets the language of the message displayed by the execution unit 500 to the language associated with the edited message (ja_DBG1) on the basis of a user's instruction. Then, the execution unit 500 attempts to display a message corresponding to the language set by the setting unit 520 by continuing the execution of the object program 207 (second S640). The execution unit 500 retrieves the message to be displayed from the messages previously cached in the memory space in the server computer 200.

The message associated with the new language, however, is not cached in the memory space by the execution unit 500 similarly to the case where the object is added. In the case where the setting unit 520 sets a new language during execution of the object program 207 in this manner, the execution unit 500 retrieves and reads a message corresponding to the new language from the memory unit 204 even if the object program 207 is being executed. Consequently, as shown in the upper left of FIG. 11C, the web browser 102 displays the edited message instead of the unedited message. For example, a message "Application Monitor へいらっしゃいませ (Hello, this is Application Monitor)" or the like is displayed instead of the message "Application Monitor へようこそ (Welcome to Application Monitor)."

The processing described in S640 to S675 hereinabove is repeated according to the progress of the user's editing work. As a result, the information system 10 can sequentially change the messages used by the object program 207 according to a user's instruction and store them into the memory unit 204 along with their histories. The user can not only reference the edited message on the screen immediately, but also reference the content at anytime dating back to a past modification stage, by changing the language setting.

As described with reference to FIG. 1 to FIG. 11, according to the information system 10 of this embodiment, the user can change or modify the message displayed by the program by a simple and intuitive operation without knowledge of the principle of operation of the program to be debugged. In addition, after the message modification, the user can check whether the modification is correctly reflected in the program without restarting the program. As described hereinabove, according to the information system 10 of this embodiment, it is possible to improve the efficiency of the development of a multi-language support program more greatly than ever before. Moreover, in order to put them into practice, it is only necessary to directly use the display function and setting function of a general-purpose web browser and web-server and to introduce only the object program 207 anew, which shows high compatibility with an existing system. Therefore, a wide variety of application programs, which run in a web server or web browser, can be applied to the present invention.

The following describes such an example that the editing program 208 displays another screen in the web browser 102, as a variation of the information system 10 according to this embodiment.

Figure 12:
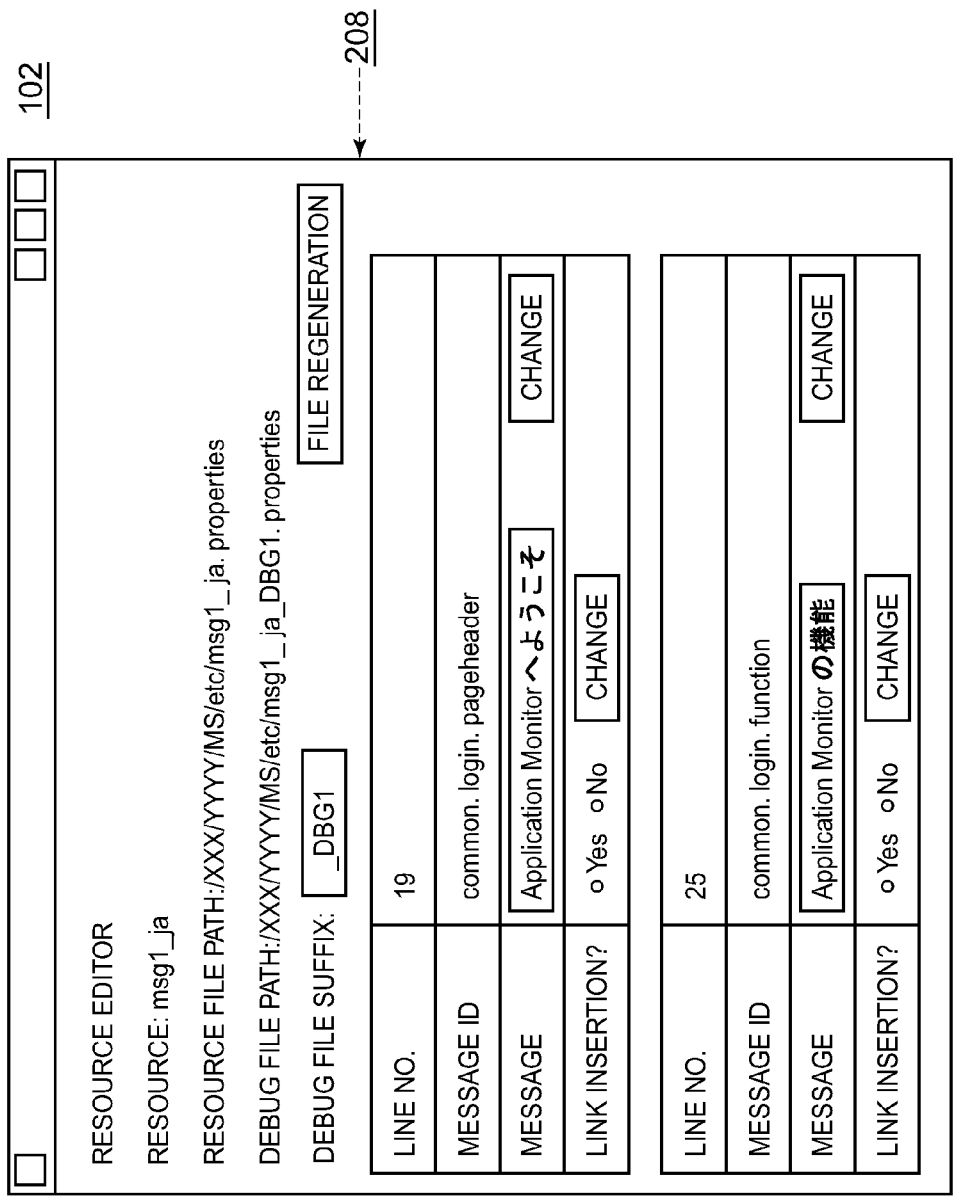
FIG. 12 is a diagram showing an example of a screen displayed in the web browser 102 by the editing program 208 in a variation of this embodiment.

Referring to FIG. 12, there is shown an example of a screen displayed in the web browser 102 by the editing program 208 in the variation of this embodiment. In this variation, upon a user's operation on the object displayed with being added to one message, the editing unit 510 displays another message including the same words as in the message concerned in addition to the display of the screen for editing the message. For example, as shown in FIG. 12, a message "Application Monitor の機能 (Functions of Application Monitor)" including the words "Application Monitor" is displayed in addition to the message "Application Monitor へようこそ (Welcome to Application Monitor)" in the web browser 102.

In order to perform the display, upon a user's operation on one object added to one message, the editing unit 510 retrieves the message from the memory unit 204, first. Subsequently, the editing unit 510 divides the message into words. In the example shown in FIG. 12, the message is divided into words "Application", "Monitor", "へ", and "ようこそ" ("Welcome", "to", "Application", and "Monitor"). Subsequently, the editing unit 510 retrieves a message including one of the divided words from the message file 700. Consequently, for example, the message "Application Monitor の機能 (Functions of Application Monitor)" is retrieved. The editing unit 510 displays the retrieved message in such a way that it can be edited, too.

Upon receiving an instruction from the user on one message, the editing unit 510 edits the message on the basis of the instruction and stores the edited message into the memory unit 204, associating it with a different language from that of the unedited message. Other components in this variation are substantially the same as those of the embodiment described with reference to FIG. 1 to FIG. 11, and therefore their description will be omitted here.

As described hereinabove, according to this variation, the user can display a plurality of related messages as editing targets only by clicking one hyperlink, and therefore the editing efficiency can be further improved.

Figure 13:
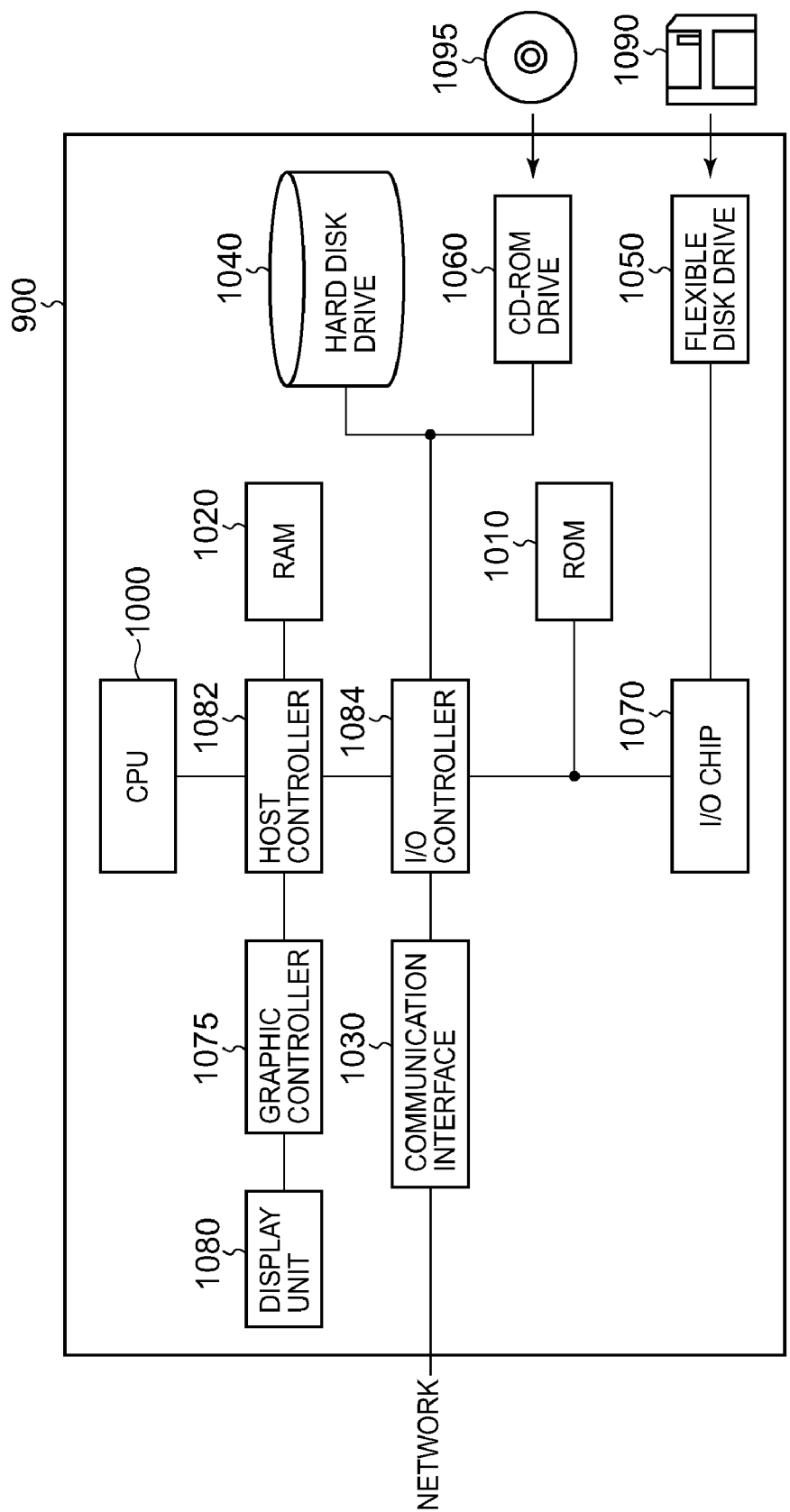
FIG. 13 is a diagram showing an example of the hardware configuration of a computer 900 which operates as a server computer 200.

Referring to FIG. 13, there is shown an example of the hardware configuration of a computer 900 which operates as the server computer 200. The computer 900 includes a CPU related part having a CPU 1000, a RAM 1020, and a graphic controller 1075 interconnected by a host controller 1082; an I/O part having a communication interface 1030 connected to the host controller 1082 by an I/O controller 1084, a hard disk drive 1040, and a CD-ROM drive 1060; and a legacy I/O part having a ROM 1010 connected to the I/O controller 1084, a flexible disk drive 1050, and an I/O chip 1070.

The host controller 1082 connects the RAM 1020 with the CPU 1000 and the graphic controller 1075 which access the RAM 1020 at a high transfer rate. The CPU 1000 operates based on programs stored in the ROM 1010 and the RAM 1020 to control various components. The graphic controller 1075 obtains image data generated on a frame buffer provided in the RAM 1020 by the CPU 1000 or the like and displays it on a display unit 1080. Alternatively, the graphic controller 1075 can include a frame buffer for storing the image data generated by the CPU 1000 or the like inside.

The I/O controller 1084 connects the host controller 1082 with the communication interface 1030, the hard disk drive 1040, and the CD-ROM drive 1060 which are relatively high-speed I/O devices. The communication interface 1030 is an implementation of the communication interface 206 shown in FIG. 1 and communicates with an external device via a network. The hard disk drive 1040 is an implementation of the memory unit 204 shown in FIG. 1 and stores programs and data used by the computer 900. The CD-ROM drive 1060 reads a program or data from a CD-ROM 1095 and supplies it to the RAM 1020 or the hard disk drive 1040.

In addition, the I/O controller 1084 is connected to the ROM 1010 and relatively low-speed I/O device such as the flexible disk drive 1050 and the I/O chip 1070. In addition, the ROM 1010 stores a boot program which is executed by the CPU 1000 at the startup of the computer 900, a program dependent on the hardware of the computer 900, and the like. The flexible disk drive 1050 reads a program or data from a flexible disk 1090 and supplies it to the RAM 1020 or the hard disk drive 1040 through the I/O chip 1070. The I/O chip 1070 connects various I/O devices, for example, through a parallel port, a serial port, a keyboard port, a mouse port, or the like in addition to the flexible disk 1090.

The program, which is provided to the computer 900, is stored in a recording medium such as the flexible disk 1090, the CD-ROM 1095, or an IC card and is provided by the user. The program is read from the recording medium through the I/O chip 1070 and/or the I/O controller 1084 and installed into the computer 900 before it is executed. The operation that the program causes the computer 900 to perform is the same as the operation in the server computer 200 according to the embodiment or its variation described with reference to FIG. 1 to FIG. 12, and therefore the description is omitted here.

The programs described above can be stored into an external recording medium. A recording medium may be an optical recording medium such as a DVD or CD, a magneto-optical recording medium such as an minidisc, a tape medium, a semiconductor memory such as an IC card, or the like, in addition to the flexible disk 1090 and the CD-ROM 1095. In addition, it is possible to use a hard disk or a storage device such as a RAM, which is provided in a server system connected to a private communication network or the Internet as a recording medium and to provide the program to the computer 900 via the network. Additionally, the hardware configuration of the client computer 100 is substantially the same as the hardware configuration of the computer 900, and therefore its description is omitted here.

While the present invention has been described hereinabove by using the preferred embodiment, the technical scope of the present invention is not limited to the above-described embodiment. It is apparent to those skilled in the art that various changes or improvements may be made in the above embodiment. It is clear from the description in the claims that such a changed or improved embodiment can be included in the technical scope of the present invention.

What is claimed is:

1. A system comprising:
a memory unit which stores a message read and displayed by the execution of a program, associating it with a language in which the message is written;
an execution unit which reads from the memory unit and displays the message corresponding to a language preset by a user by executing the program;
an editing unit which edits the message stored in the memory unit and stores the edited message into the memory unit, associating it with a different language from that of the unedited message, on the basis of a user's instruction; and
a setting unit which makes a setting for changing the language of the message displayed by the execution unit from the language corresponding to the unedited message to the language associated with the edited message, wherein the execution unit reads from the memory unit and displays the message corresponding to the language set by the setting unit, thereby displaying the edited message instead of the unedited message;
wherein:
the memory unit stores a plurality of messages selectively read and displayed by the execution of the program, associating them with individual languages;
the system further comprises an object adding unit, which adds an object for displaying a screen for editing the message concerned upon a user's operation, to each of the plurality of messages stored in the memory unit in response to an instruction for the start of editing, and stores the plurality of messages to which the objects are added into the memory unit, associating them with a different language from that of the plurality of messages to which the objects are not added yet;
the setting unit sets the language of the message displayed by the execution unit to the language associated with the plurality of messages to which the objects are added on the basis of a user's instruction;
the execution unit displays the message to which the object is added, instead of the message to which the object is not added yet, by reading from the memory unit and displaying the message corresponding to the language set by the setting unit; and
the editing unit displays the screen for editing a message upon a user's operation on the displayed object added to the message and edits the message on the basis of a user's operation on the screen, thereafter storing the edited message into the memory unit associating it with still another language.

2. A system according to claim 1, wherein:
the program is executed by either one of a web browser and a web server so as to display a message on the screen of the web browser;
the respective messages are written in HyperText Markup Language (HTML);
the object adding unit adds a hyperlink, which includes a URL of a message editing program previously executed by the web server and parameters for setting the messages as targets of editing by the message editing program, as the object to each of the plurality of messages;
the execution unit is implemented as the web browser or the web server and displays the message with the hyperlink added thereto on the screen by executing the program;
the setting unit is implemented as the web browser and sets the language of the message displayed on the screen of the web browser on the basis of a user's instruction; and
the editing unit is implemented as the message editing program which runs on the web server or the web browser and starts the operation with a user's click on the displayed hyperlink to read the message from the memory unit and display it for editing.

3. A system according to claim 1, wherein:
the editing unit stores the edited message into the memory unit, associating it with a new language which is different from the language already stored in the memory unit, in order to cause the execution unit to recognize as if the message were written in a different language from that of the unedited message; and
the execution unit previously reads and caches the message already stored in the memory unit and outputs the cached message according to the execution of the program for starting the execution of the program, while it reads the message corresponding to a new language from the memory unit in the case where the setting unit sets a new language during execution of the program.

4. A system according to claim 1, wherein the editing unit displays the screen for editing a message upon a user's operation on the displayed object added to the message, retrieves another message including the same words as the message concerned from the memory unit, and displays a screen for editing the retrieved message.

5. A system comprising:
   a memory unit which stores a plurality of messages read and displayed by executing a program, associating them with a language in which the plurality of messages are written;
   an execution unit which selectively reads from the memory unit and displays one message out of the plurality of messages corresponding to a language preset by a user by executing the program;
   an object adding unit which adds an object for displaying a screen for editing the message upon a user's operation, to each of the plurality of messages stored in the memory unit on the basis of the user's instruction and stores the plurality of messages to which the objects are added into the memory unit, associating them with a different language from that of the plurality of messages to which the objects are not added yet; and
   a setting unit which sets the language of the messages displayed by the execution unit to the language associated with the plurality of messages to which the objects are added on the basis of the user's instruction,
   wherein the execution unit reads from the memory unit and displays the message corresponding to the language set by the setting unit, thereby displaying the edited message instead of the unedited message.

* * * * *